May 4, 1926.

H. W. WAGNER ET AL

DRAFT ARRANGEMENT

Filed March 23, 1925   2 Sheets-Sheet 1

1,582,947

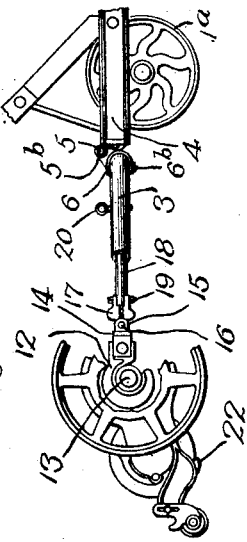
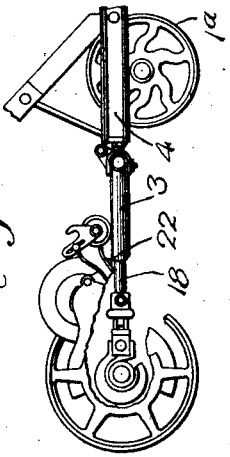
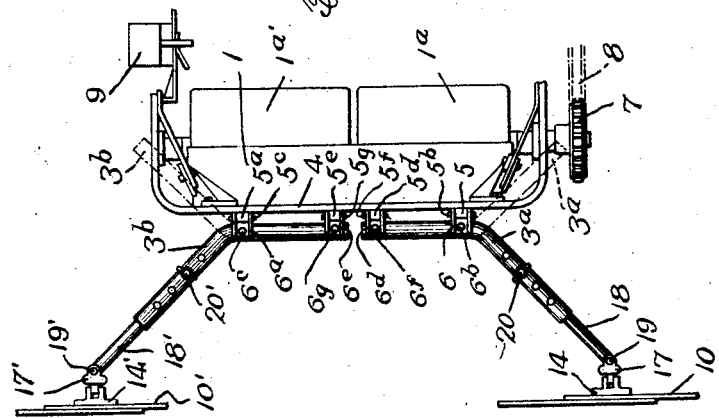
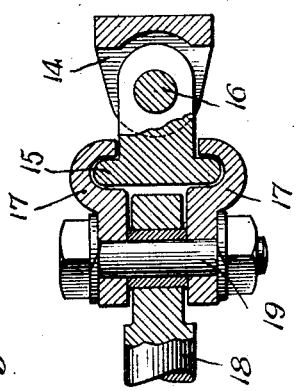
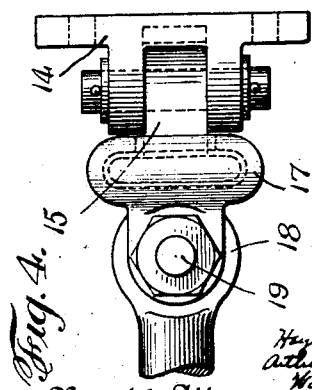

Patented May 4, 1926.

1,582,947

UNITED STATES PATENT OFFICE.

HAYDEN W. WAGNER, OF NEWBURGH, ARTHUR D. CASE, OF BEACON, AND WALTER GEDNEY, OF NEWBURGH, NEW YORK, ASSIGNORS TO COLDWELL LAWN MOWER COMPANY, OF NEWBURGH, NEW YORK, A CORPORATION OF NEW YORK.

DRAFT ARRANGEMENT.

Application filed March 23, 1925. Serial No. 17,460.

*To all whom it may concern:*

Be it known that we, HAYDEN W. WAGNER, a citizen of the United States, and resident of Newburgh, Orange County, New York, and ARTHUR D. CASE, a citizen of the United States, and resident of Beacon, county of Dutchess, New York, and WALTER GEDNEY, a citizen of the United States, and resident of Newburgh, Orange County, New York, have invented certain new and useful Improvements in Draft Arrangements, of which the following is a specification.

This invention relates to a draft arrangement, and more particularly to such an arrangement whereby a power lawn mower and one or more trailer mowers may be connected together.

Power mowers of the type herein referred to are necessarily provided with more power than is needed to propel them on level ground, in order that they may be used on inclines. When, therefore, the power mower is used on level ground it has an excess of power which is not being used.

By furnishing a suitable draft arrangement, wherein trailer mowers may readily and easily be attached to and detached from the power mower, this excess power may be utilized to advantage on level ground or on declines.

The main object of the invention is to provide improved means for connecting a trailer mower or mowers to a power mower in an efficient, and simple manner.

This application is in part a continuation of our application Serial No. 746,476, filed October 29, 1924.

According to the invention in its preferred form the trailer mowers may be towed behind the power mower with their rotary cutters not only raised from the ground, but inactively positioned, so that only a minimum of power is necessary to tow them in this position; also the trailer mowers individually may be adjusted laterally and rearwardly of the power mower. Likewise the trailer mowers may be individually detached from the power mower, or one may be made inoperative while the other is left operative and while both trailer mowers are still connected to the power mower.

Further objects, features and advantages of the invention will more fully appear from the following description taken in connection with the accompanying drawings illustrating by way of example the preferred embodiment of the invention, and in which—

Figure 1:
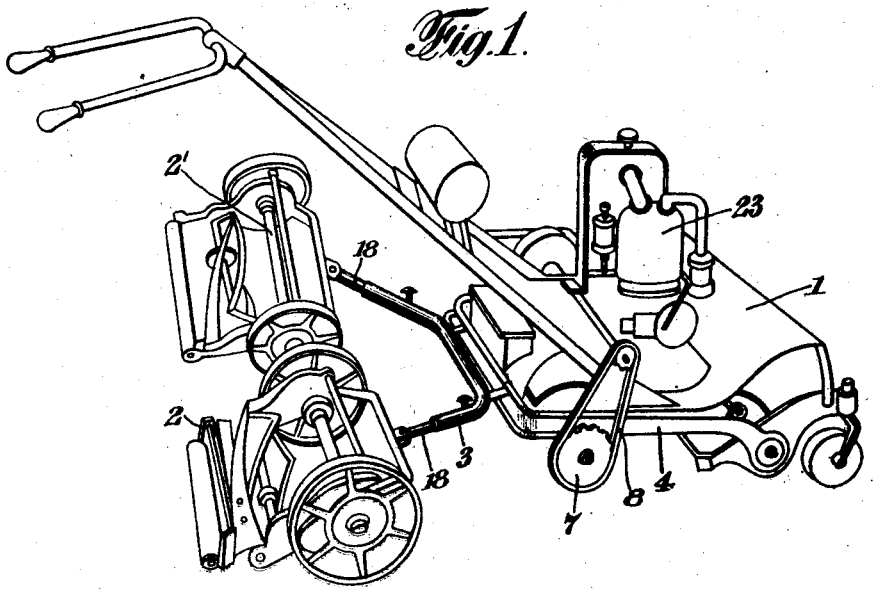
Figure 2:
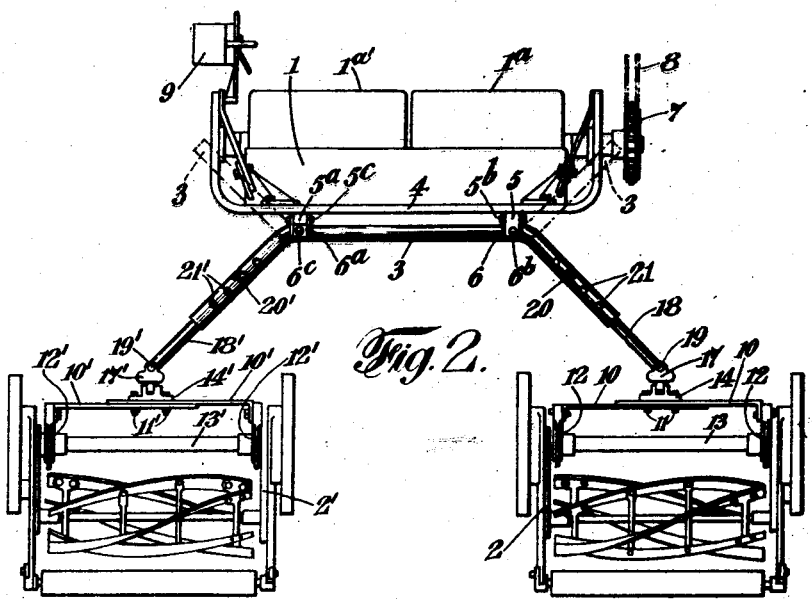

Fig. 1 is a perspective view showing the general arrangement of the apparatus with the trailer mowers in operative position, Fig. 2 is a plan view showing the apparatus more in detail with parts of the power mower broken away, Fig. 3 is a side elevation of Fig. 2 with certain parts broken away, Fig. 4 is a detail, of a portion of the mechanism for connecting the trailer mowers to the power mower, Fig. 5 is another view of the parts shown in Fig. 4, largely in section, and taken at right angles to Fig. 4, Fig. 6 shows a trailer mower turned upside down for inoperatively positioning the rotary cutter, and Fig. 7 is a view similar to Fig. 2 showing a modification of the hitch bar.

Referring to the drawings, and more particularly to Figs. 1 and 2; a power mower 1 with a driving motor 23 thereon, which is adapted to drive the traction rollers $1^a$ and $1^{a\prime}$, is shown with trailer mowers 2 and $2'$ operatively attached thereto by means of a hitch bar 3 and associated parts. The tubular hitch bar 3 is horizontally pivoted to a suitable part of the power mower such as the frame member 4 and each end of the hitch bar 3 is bent rearwardly. In the present embodiment the pivotal attachment is made by means of the cooperating hinge members 5—$5^a$ and 6—$6^a$ together with the hinge pins $5^b$ and $5^c$. The members 5 and $5^a$ are rigidly attached to the frame member 4, the members 6—$6^a$ are rigidly attached to the hitch bar 3, by bolts $6^b$ and $6^c$, and the parts 5 and 6 and $5^a$ and $6^a$ are pivotally connected by the horizontal hinge pins $5^b$ and $5^c$. The pivotal attachment permits the hitch bar 3 to be swung over and against the power mower frame 4, as indicated in the dotted position shown in Fig. 2, and in a position where it does not interfere with parts of the power mower such as the driving sprocket 7, chain 8, or other parts such as the projection 9. When so folded in inoperative position the hitch bar lies within the lateral extremities of the power mower.

In describing the trailer mower connections to the hitch bar 3 and power mower 1, only one set of parts will be described; it being understood that the parts associated with the other trailer mower are identical.

The trailer bar 10 for the trailer 2, is composed of two parts adjustably connected together by bolts 11 to adapt the bar to varying widths of trailer mowers. A hook 12 is attached to each end of the bar 10 and these hooks engage some suitable part of the trailer mower such as the axle 13, and are adapted for rotation with respect to axle 13. A bifurcated hinge member 14 (see also Figs. 4 and 5) is attached to the trailer bar 10 by means of the bolts 11; and pivotally attached to this is a disc headed member 15, the stem of which is connected to the hinge member 14 by means of a horizontal pivot pin 16. The disc head of the member 15 is engaged by cooperating members 17 which partly enclose the disc head, and are pivotally attached to an arm 18 by means of a vertical pivot bolt 19 which passes through the flattened end of the arm 18. The other end of the arm 18 telescopically engages one of the rearwardly outwardly extending ends of the tubular hitch bar 3. The arm is adjustably held therein by means of a pin 20 which passes through a hole in the arm 18 and is adapted to engage any one of a series of holes 21 extending vertically through the rearwardly extending end of the hitch bar. This provides a means of adjusting the lateral position of the trailer mower with respect to the power mower, and for detachably securing the trailer to the hitch bar and power mower.

The parts shown in Figs. 4 and 5 and herein described, constitute a universal joint, wherein one part is free to rotate 180° or more with respect to the other part; so that the trailer mower 2 is not only free to oscillate about a horizontal axis and about a vertical axis, but is also free to be rotated through at least 180° in a vertical plane parallel to the axis of the axle 13. The corresponding parts 10′, 11′, 12′, 13′, 14′, 17′, 18′, 19′, 20′, 21′, etc. operate similarly with respect to the trailer 2′.

When the apparatus is being moved to the place where it is to be used, the trailer mowers are raised and rotated 180° then dropped back again, and then the rear part of each trailer is swung over forwardly about the axle 13 as an axis with the trailer driving wheels on the ground until the fixed blade 22 of this trailer mower rests on the arm 18, or hitch bar 3 (Fig. 6). In this position the traction wheels of the trailer mower will be reversed and its rotary cutter will be inoperative. When it is desired to operate the mowers they are turned back to their operative position without in any way disconnecting the trailer mowers from the power mower.

When desired one trailer mower alone may be used, by merely disconnecting the other, by removing its connecting pin 20. Likewise both may be disconnected and in the latter case the hitch bar 3 is then folded as indicated by dotted lines on Fig. 2, in which position the bar will not drag on the ground.

It will thus be seen that when mowing on ground with relatively steep inclines the trailer mowers may be quickly and easily disconnected so that the full power of the motor may be utilized to propel the power mower unit alone, and when operating on relatively level ground where less power is required to propel the power mower unit, one or both trailer units may be quickly attached in order that the excess power of the motor may be used to cut a wider swath.

In place of the single hitch bar 3 the modification shown in Fig. 7 may be used. In this modification the hitch bar is divided into two separate parts $3^a$ and $3^b$. The rearwardly extending ends of these parts are identical with those of the single bar; and the attachment of these parts to the mower 1 is similar to the attachment of the single bar, with the following exceptions. Additional hinge fastening means comprising the hinge parts $5^d$—$6^d$—$5^f$—$6^f$ are provided for attaching the half bar $3^a$; and additional hinge fastening means comprising the hinge parts $5^e$—$6^e$—$5^g$—$6^g$ are provided for attaching the half bar $3^b$.

This provision of a divided hitch bar provides a much more flexible means of manipulation than the single hitch bar allows. Also a single mower may be used on one side and the other disconnected; in which case the half bar not in use may be folded up out of the way as indicated by the dotted lines in Fig. 7.

While we have described our improvements in great detail and with respect to a preferred embodiment of the invention, and have shown one modification thereof, we do not desire to be limited to such details or forms since many changes and modifications may be made and the invention embodied in widely different forms without departing from the spirit and scope thereof in its broader aspects.

What we claim as new and desire to secure by Letters Patent, is:

1. A draft arrangement for attaching a plurality of trailer mowers to a power mower including hitch bar means pivotally connected to the power mower to swing about a horizontal axis with respect thereto, said hitch bar means having rearwardly extending portions, and universal joint connections attached to said rearwardly extending portions and adapted to connect said portions to a plurality of trailer mowers respectively.

2. A draft arrangement for attaching a plurality of trailer mowers to a power mower including a plurality of trailer bars pivotally connected respectively to a plurality of trailer mowers to swing about a horizontal axis with respect thereto, and means including universal joints for connecting said trailer bars to said power mower and permitting said trailer mowers to be oscillated in a vertical plane extending through the axes of the respective trailer mowers.

3. A draft arrangement for attaching a plurality of trailer mowers to a power mower including hitch bar means pivotally connected to a power mower, a plurality of trailer bars pivotally connected respectively to a plurality of trailer mowers to swing about a horizontal axis with respect thereto, and means including universal joints for connecting said trailer bars to said hitch bar means and permitting said trailer mowers to be oscillated in a vertical plane extending through the axes of the respective trailer mowers.

4. A draft arrangment for attaching a plurality of trailer mowers to a power mower including hitch bar means secured to said power mower, said hitch bar means having rearwardly extending portions which extend outwardly laterally, and means for adjustably connecting the trailer mowers to said rearwardly extending portions whereby the trailer mowers may be connected to the power mower at various distances therefrom and at various positions laterally with respect thereto, said last mentioned means including universal joint connections, permitting the trailer mowers to be oscillated in a vertical plane extending through their axes respectively, as well as in a vertical plane at right angles thereto.

5. A draft arrangement for attaching a plurality of trailer mowers to a power mower including hitch bar means pivotally attached to said power mower and free to oscillate with respect thereto about a horizontal axis, said hitch bar means having rearwardly extending ends, arms adjustably attached to said ends respectively, adjustable trailer bars, horizontal swivel means and vertical swivel means for attaching said trailer bars to said arms, and horizontal swivel means adapted for attaching said trailer bars to said trailer mowers.

6. A draft arrangement for attaching a plurality of trailer mowers to a power mower including hitch bar means pivotally attached to said power mower and free to oscillate with respect thereto about a horizontal axis, an arm adjustably attached to each end of said hitch bar means respectively, horizontal swivel means and vertical swivel means carried by each of said arms, and an adjustable trailer bar attached to each of said arms by said horizontal and vertical swivel means and pivotally attached to said trailer mowers and free to oscillate with respect thereto about horizontal axes.

7. A draft arrangement for attaching a plurality of trailer mowers to a power mower including hitch bar means adapted to be pivotally attached to said power mower free to oscillate with respect thereto about a horizontal axis, an arm adjustably detachably secured to each end of said hitch bar means respectively, a universal joint associated with each of said arms respectively, and means for pivotally attaching each of said universal joints to one of said trailer mowers thereby permitting an individual oscillatory motion about a horizontal axis between said power mower and said hitch bar means, individual oscillatory motion about a vertical axis between each of said trailer mowers and its said respective cooperating arm, and additional individual oscillatory motions about horizontal and vertical axis between each of said trailer mowers and its said respective cooperating arm.

8. In a draft arrangement the combination of a transverse hitch bar means adapted to be pivotally attached to a power mower free to oscillate with respect thereto about a horizontal axis, arms detachably secured to each end of said hitch bar means respectively, universal joints associated one with each of said arms, and trailer bars attached one to each of said universal joints and each adapted to be pivotally connected to a trailer mower.

9. In a draft arrangement the combination of transverse tubular hitch bar means adapted to be pivotally connected to a power mower free to oscillate with respect thereto about a horizontal axis, arms telescopically engaging respective ends of said hitch bar means, means for detachably and adjustably attaching said arms to said hitch bar means, and swivel means associated with each of said arms and adapted to be attached each to a trailer mower to permit relative oscillatory motion about vertical and horizontal axes individually between each of said trailer mowers and its cooperating respective arm.

10. In a draft arrangement the combination of a transverse hitch bar pivotally attached to a pulling device free to oscillate with respect thereto about a horizontal axis, an arm detachably secured to said hitch bar, a universal joint associated with said arm, and a trailer bar attached to said universal joint and adapted to be pivotally connected to a trailer device.

11. In a draft arrangement the combination of a transverse hitch bar adapted to be pivotally attached to a pulling device free to oscillate with respect thereto about a horizontal axis, an arm detachably secured to said hitch bar, a trailer bar adapted to be pivotally connected to a trailer device to permit relative vertical oscillatory motion between said trailer bar and said trailer device, and a universal joint composed of at least two parts movable with respect to each other, one part of which is adapted to be rotated 180° with respect to the other part connected, one part to said arm and the other part to said trailer bar, whereby said trailer bar will be permitted free movement in at least two planes and rotary movement of 180° with respect to said arm.

12. In a draft arrangement the combination of a hitch bar horizontally pivoted to a power mower, and a universal joint for attaching a trailer mower to said hitch bar and power mower, said universal joint permitting said trailer mower a rotative movement of 180° in the plane of the axle of said trailer mower while attached to said universal joint.

13. In a draft arrangement the combination of a transverse hitch bar means comprising two separate parts each pivotally attached to a pulling device free to oscillate with respect thereto about their respective horizontal axes, arms detachably secured respectively to said hitch bar parts, universal joints associated respectively with said arms, and trailer bars attached respectively to said universal joints and pivotally connected to a trailer device.

14. A draft arrangement for attaching a plurality of trailer mowers to a power mower having in combination a hitch bar pivotally mounted to the power mower about a horizontal axis, a connecting member adjustably secured to the hitch bar and adjustable laterally with respect to the hitch bar, a trailer bar secured to the trailer and pivotally mounted with respect thereto about a horizontal axis, and a universal joint connecting said trailer bar to said connecting member.

15. A draft arrangement for attaching a plurality of trailer mowers to a power mower having in combination a hitch bar pivotally mounted to the power mower about a horizontal axis, a connecting member adjustably secured to the hitch bar and adjustable laterally with respect to the hitch bar, a trailer bar secured to the trailer and pivotally mounted with respect thereto about a horizontal axis, two members connected to rotate with respect to one another on an axis at right angles to said first mentioned axes, one of said last mentioned members being pivoted to said connecting member and the other being pivotally connected to said trailer bar.

In testimony whereof we have signed our names to this specification.

HAYDEN W. WAGNER.
ARTHUR D. CASE.
WALTER GEDNEY.